US009172086B2

(12) United States Patent
Park

(10) Patent No.: US 9,172,086 B2
(45) Date of Patent: Oct. 27, 2015

(54) CATHODE AND LITHIUM BATTERY USING THE SAME

(75) Inventor: Kyu-Sung Park, Suwon-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 385 days.

(21) Appl. No.: 12/631,224

(22) Filed: Dec. 4, 2009

(65) Prior Publication Data

US 2010/0143799 A1 Jun. 10, 2010

(30) Foreign Application Priority Data

Dec. 5, 2008 (KR) .................. 10-2008-0123153
Sep. 3, 2009 (KR) .................. 10-2009-0083149

(51) Int. Cl.
*H01M 4/36* (2006.01)
*H01M 4/485* (2010.01)
*H01M 4/505* (2010.01)
*H01M 4/525* (2010.01)
*H01M 10/052* (2010.01)
*H01M 4/62* (2006.01)
*H01M 4/64* (2006.01)
*H01M 4/04* (2006.01)

(52) U.S. Cl.
CPC .............. *H01M 4/364* (2013.01); *H01M 4/485* (2013.01); *H01M 4/505* (2013.01); *H01M 4/525* (2013.01); *H01M 10/052* (2013.01); *H01M 4/0404* (2013.01); *H01M 4/62* (2013.01); *H01M 4/64* (2013.01); *Y02E 60/122* (2013.01)

(58) Field of Classification Search
CPC ..... H01M 4/364; H01M 4/505; H01M 4/525; H01M 5/485; H01M 4/62; H01M 4/64; H01M 4/0404; H01M 10/052; Y02E 60/122
USPC .................. 429/231, 95, 231.1, 231.2, 231.3, 429/231.5, 220, 223, 224; 427/58; 252/500, 252/519.12, 519.13, 519.15
See application file for complete search history.

(56) References Cited

U.S. PATENT DOCUMENTS

| | | | |
|---|---|---|---|
| 6,346,348 B1 | 2/2002 | Nakajima et al. | |
| 6,391,496 B1 | 5/2002 | Nakajima et al. | |
| 6,908,710 B2 | 6/2005 | Barker et al. | |
| 6,949,233 B2 | 9/2005 | Kweon et al. | |
| 6,991,874 B1 | 1/2006 | Möhwald et al. | |
| 7,364,793 B2 | 4/2008 | Paulsen et al. | |
| 7,981,545 B2 | 7/2011 | Takamuku et al. | |
| 2003/0073003 A1 | 4/2003 | Barker et al. | |
| 2003/0138697 A1 | 7/2003 | Leising et al. | |
| 2005/0265909 A1 | 12/2005 | Kajiya et al. | |
| 2006/0105241 A1 | 5/2006 | Tode et al. | |
| 2006/0194119 A1 | 8/2006 | Son et al. | |
| 2006/0251967 A1 | 11/2006 | Goh | |
| 2009/0098278 A1 | 4/2009 | Suh et al. | |
| 2009/0325072 A1 | 12/2009 | Maeda et al. | |
| 2012/0231308 A1 | 9/2012 | Chiang et al. | |

FOREIGN PATENT DOCUMENTS

| | | |
|---|---|---|
| CA | 2222494 A1 | 5/1999 |
| CA | 2 577 215 C | 2/2012 |
| CN | 101006012 A | 7/2007 |
| JP | 02-265167 A | 10/1990 |
| JP | 04-022066 A | 1/1992 |
| JP | 06-342673 A | 12/1994 |
| JP | 10-208730 A | 8/1998 |
| JP | 2000-231920 A | 8/2000 |
| JP | 2000-277113 | 10/2000 |
| JP | 2001-015115 A | 1/2001 |
| JP | 2001-160395 A | 6/2001 |
| JP | 2004-055472 | 2/2004 |
| JP | 2005-063673 A | 3/2005 |
| JP | 2005-078800 A | 3/2005 |
| JP | 2005-079077 | 3/2005 |
| JP | 2005-340078 | 12/2005 |
| JP | 2006-032325 | 2/2006 |
| JP | 2007-005267 A | 1/2007 |
| JP | 2007-018795 | 1/2007 |
| JP | 3904392 | 1/2007 |
| JP | 2007-207490 A | 8/2007 |
| JP | 2007-242420 A | 9/2007 |
| JP | 2008-166118 A | 7/2008 |
| JP | 2008-532224 A | 8/2008 |
| JP | 2010-009799 | 1/2010 |
| JP | 2011-517361 A | 6/2011 |
| KR | 10-2001-0096191 | 11/2001 |
| KR | 2002-0092736 | 12/2002 |

(Continued)

OTHER PUBLICATIONS

U.S. Appl. No. 12/631,198, filed Dec. 4, 2009, Kyu-Sung Park, Samsung SDI Co., Ltd.
English Machine Translation of Japanese Patent Publication No. 06-342673 A, published on Dec. 13, 1994, 19 pages.
English Machine Translation of Japanese Patent Publication No. 10-208730 A, published on Aug. 7, 1998, 20 pages.
English Machine Translation of Japanese Patent Publication No. 2001-015115 A, published on Jan. 19, 2001, 18 pages.
English Machine Translation of Japanese Patent Publication No. 2001-160395 A, published on Jun. 12, 2001, 47 pages.
English Machine Translation of Japanese Patent Publication No. 2005-063673 A, published on Mar. 10, 2005, 49 pages.

(Continued)

*Primary Examiner* — Laura Weiner
(74) *Attorney, Agent, or Firm* — Christie, Parker & Hale, LLP

(57) ABSTRACT

A cathode and a lithium battery including the cathode have improved electrical characteristics. The cathode includes a cathode active material composition including a conducting agent, a binder, and a cathode active material, wherein the cathode active material includes a first lithium compound and a second lithium compound, the first lithium compound having an open-circuit voltage greater than an open-circuit voltage of the second lithium compound, and wherein the second lithium compound includes a metal oxide coating layer.

12 Claims, 4 Drawing Sheets

(56) References Cited

FOREIGN PATENT DOCUMENTS

| | | |
|---|---|---|
| KR | 10-2003-0033912 | 5/2003 |
| KR | 10-406816 | 11/2003 |
| KR | 10-437340 | 6/2004 |
| KR | 10-2004-0096203 | 11/2004 |
| KR | 10-2005-0048452 | 5/2005 |
| KR | 10-2005-0114516 | 12/2005 |
| KR | 10-2006-0021252 | 3/2006 |
| KR | 2006-28121 | 3/2006 |
| KR | 10-2006-0041649 | 5/2006 |
| KR | 10-2006-0048698 | 5/2006 |
| KR | 10-2006-0051196 | 5/2006 |
| KR | 10-627271 | 9/2006 |
| KR | 10-2006-0119382 | 11/2006 |
| KR | 10-2007-0008110 | 1/2007 |
| KR | 10-2007-0027985 | 3/2007 |
| KR | 10-2007-0066453 | 6/2007 |
| KR | 10-2007-0080849 | 8/2007 |
| KR | 10-752037 | 8/2007 |
| KR | 10-2008-0048397 | 6/2008 |
| KR | 10-2008-0049157 | 6/2008 |
| KR | 10-2008-0068593 | 7/2008 |
| KR | 10-2008-0090157 | 10/2008 |
| KR | 10-2008-0090655 | 10/2008 |
| KR | 10-2008-0099131 | 11/2008 |
| KR | 10-2008-0099132 | 11/2008 |
| KR | 10-2009-0013661 | 2/2009 |
| KR | 10-2009-0030087 | 3/2009 |
| KR | 10-2010-0002107 | 1/2010 |
| WO | WO 2006/033529 A1 | 3/2006 |
| WO | WO 2006/091020 | 8/2006 |

OTHER PUBLICATIONS

English Machine Translation of Japanese Patent Publication No. 2005-078800 A, published on Mar. 24, 2005, 40 pages.
English Machine Translation of Japanese Patent Publication No. 2007-005267 A, published on Jan. 11, 2007, 40 pages.
English Machine Translation of Japanese Patent Publication No. 2007-207490 A, published on Aug. 16, 2007, 62 pages.
English Machine Translation of Japanese Patent Publication No. 2007-242420 A, published on Sep. 20, 2007, 49 pages.
Japanese Office action along with English Machine Translation for Patent Application No. 2009277894, dated Nov. 19, 2013, 6 pages.
U.S. Office action dated Sep. 25, 2012, for cross reference U.S. Appl. No. 12/631,198, (11 pages).
U.S. Office action dated Jan. 23, 2013, for cross reference U.S. Appl. No. 12/631,198, (9 pages).
JPO Office action dated Feb. 21, 2012 for Japanese Patent application 2009-275578, (2 pages).
James, et al., *Structure and Bonding in $Li_2MoO_3$ and $Li_{2-x}MoO_3$* ($0 \leq x \leq 1.7$), Journal of Solid State Chemistry, vol. 76, (1988), pp. 87-96.
Gopalakrisfinan, et al., Oxidative Extraction and Ion-Exchange of Lithium in $Li_2MoO_3$ : Synthesis of $Li_{2-x}MoO_3$ ($0 < x \leq 2.0$) and $H_2MoO_3{}^+$, Mater. Res. Bulletin, vol. 22, (1987), pp. 769-774.
KIPO Notice of Allowance dated Nov. 21, 2011, corresponding to Korean priority Patent application 10-2009-0083149, (5 pages).
Patent Abstracts of Japan, and English machine translation of Japanese Publication 2007-018795 dated Jan. 25, 2007, listed above, (43 pages).
KIPO Office action dated Feb. 23, 2015, for Korean Patent application 10-2008-0123153, (5 pages).
Patent Abstracts of Japan, and English machine translation of Japanese Publication 2005-340078 dated Dec. 8, 2005, listed above, (30 pages).

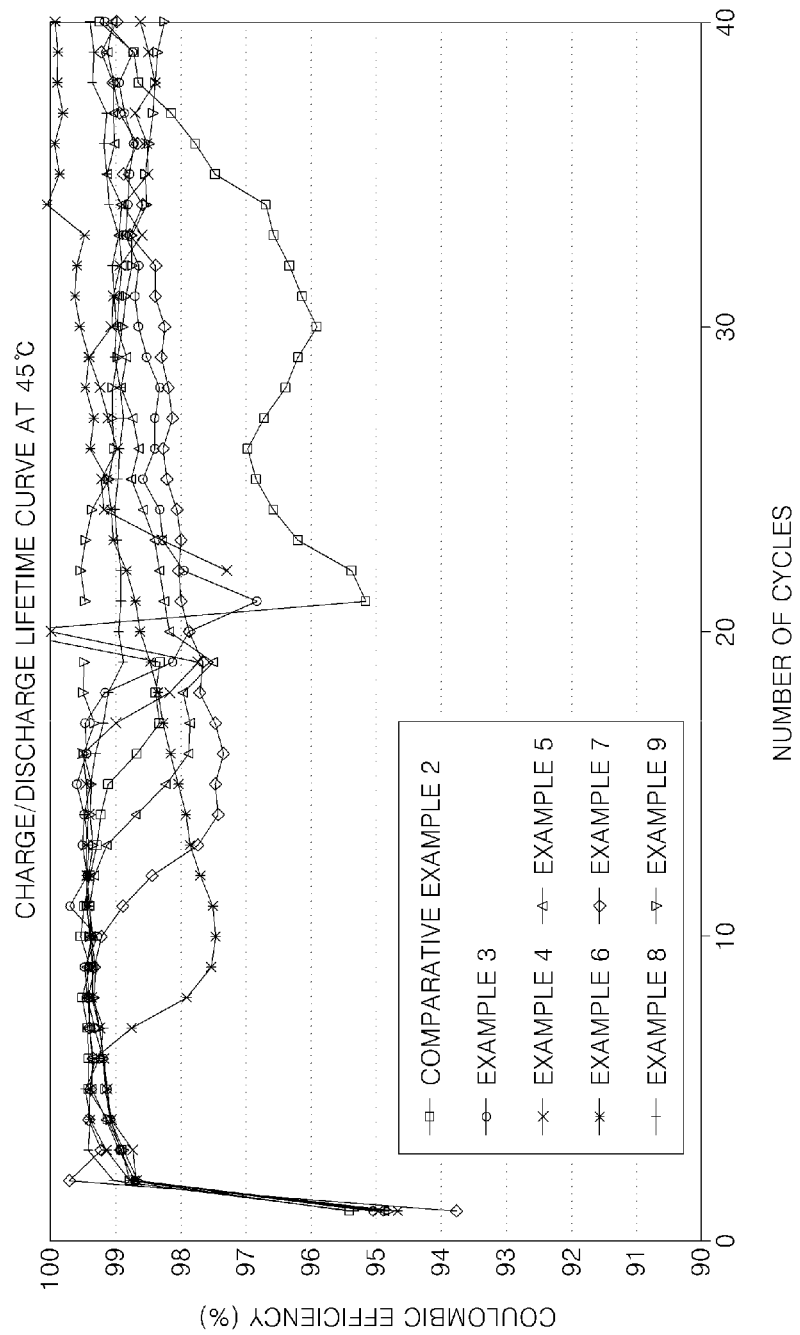

CATHODE AND LITHIUM BATTERY USING THE SAME

CROSS-REFERENCE TO RELATED APPLICATIONS

This application claims the benefit of Korean Patent Application No. 10-2008-0123153, filed Dec. 5, 2008, and Korean Patent Application No. 10-2009-0083149, filed on Sep. 3, 2009, in the Korean Intellectual Property Office, the disclosures of which are incorporated herein by reference.

BACKGROUND OF THE INVENTION

1. Field

The present disclosure relates to a cathode and a lithium battery including the same, and more particularly, to a cathode with improved electrical characteristics and a lithium battery including the same.

2. Description of the Related Art

In general, transition metal compounds such as $LiNiO_2$; $LiCoO_2$; $LiMn_2O_4$; $LiFePO_4$; $LiNi_xCo_{1-x}O_2$ ($0<x<1$), and $LiNi_{1-x-y}Co_xMn_yO_2$ ($0 \leq x \leq 0.5$ and $0 \leq y \leq 0.5$) are used as cathode active materials for lithium batteries.

However, there is a demand for improving the high-rate characteristics and capacities of these cathode active materials, so as to produce next-generation lithium batteries having a high capacity, which have become necessary as mobile electronic devices have become more complex and perform more functions. Such lithium batteries may be manufactured by improving the designs of battery systems, manufacturing techniques, and materials thereof.

Meanwhile, $Li_2MoO_3$ has recently drawn more attention as an active material because the active material does not contain cobalt (Co), which is expensive and toxic. However, deintercalation of lithium is suppressed due to interlayer movement of $Mo^{6+}$ ions, which are generated during charging.

SUMMARY OF THE INVENTION

Aspects of the invention provide a cathode including a cathode active material with improved electrical characteristics. Aspects of the invention provide a lithium battery including the cathode.

Additional aspects will be set forth in part in the description which follows and, in part, will be apparent from the description, or may be learned by practice of the presented embodiments.

According to an aspect of the present invention, a cathode includes: a current collector; and a cathode active material composition disposed on a surface of the current collector, the cathode active material composition comprising a conducting agent, a binder, and a cathode active material, wherein the cathode active material comprises a first lithium compound having an open-circuit voltage of about 3V or greater and a second lithium compound having an open-circuit voltage of less than 3V, wherein the second lithium compound comprises a metal oxide coating layer.

According to aspects of the invention, the metal oxide coating layer may include at least one metal oxide selected from compounds represented by Formulae 1 through 4 below:

$$M'''_a(MoO_3)_b \quad \text{Formula 1}$$

wherein M''' is at least one selected from the group consisting of barium (Ba), calcium (Ca), strontium (Sr), lead (Pb), manganese (Mn), iron (Fe), cobalt (Co), nickel (Ni), copper (Cu), zinc (Zn), magnesium (Mg), cadmium (Cd), silver (Ag), and lithium (Li); a is a number from about 0.5 to about 1.5; and b is a number from about 0.3 to about 3.0, $$M'_c(MoO_4)_d \quad \text{Formula 2}$$

wherein M' is at least one selected from the group consisting of barium (Ba), calcium (Ca), strontium (Sr), lead (Pb), manganese (Mn), iron (Fe), cobalt (Co), nickel (Ni), copper (Cu), zinc (Zn), magnesium (Mg), cadmium (Cd), silver (Ag), and lithium (Li); c is a number from about 0.5 to about 1.5; and d is a number from about 0.3 to about 3.0, $$M''O_e \quad \text{Formula 3}$$

wherein M'' is at least one selected from the group consisting of aluminum (Al), magnesium (Mg), silicon (Si), titanium (Ti), zirconium (Zr), zinc (Zn), barium (Ba), strontium (Sr), calcium (Ca), and lithium (Li); and e is a number from about 0.5 to about 2.5, and $$Li_3PO_4. \quad \text{Formula 4}$$

The second lithium compound may include at least one metal element selected from the group consisting of molybdenum (Mo), titanium (Ti), chromium (Cr), vanadium (V), and copper (Cu).

The second lithium compound may include a lithium metal compound represented by Formula 5 below:

$$Li_xM_yMo_zO_3 \quad \text{Formula 5}$$

wherein $0.1 \leq x \leq 2.3$, $0 < y \leq 0.3$, and $0.7 \leq z \leq 1.1$, and M is at least one element selected from the group consisting of aluminum (Al), gallium (Ga), germanium (Ge), magnesium (Mg), niobium (Nb), zinc (Zn), cadmium (Cd), titanium (Ti), cobalt (Co), nickel (Ni), potassium (K), sodium (Na), calcium (Ca), silicon (Si), iron (Fe), copper (Cu), tin (Sn), vanadium (V), boron (B), phosphorus (P), selenium (Se), bismuth (Bi), arsenic (As), zirconium (Zr), manganese (Mn), chromium (Cr), strontium (Sr), vanadium (V), scandium (Sc), yttrium (Y), and a rare-earth element, and mixtures thereof.

The first lithium compound may include at least one metal element selected from the group consisting of cobalt (Co), nickel (Ni), and manganese (Mn).

According to another aspect of the present invention, a lithium battery includes: the cathode described above; an anode; a separator disposed between the anode and the cathode, and an organic electrolytic solution disposed in the lithium battery.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which:

FIG. 4 is a graph of coulombic efficiency with respect to the number of cycles of the lithium batteries including the cathode active materials prepared in Comparative Example 2 and Examples 3 through 9.

DETAILED DESCRIPTION

Figure 1:
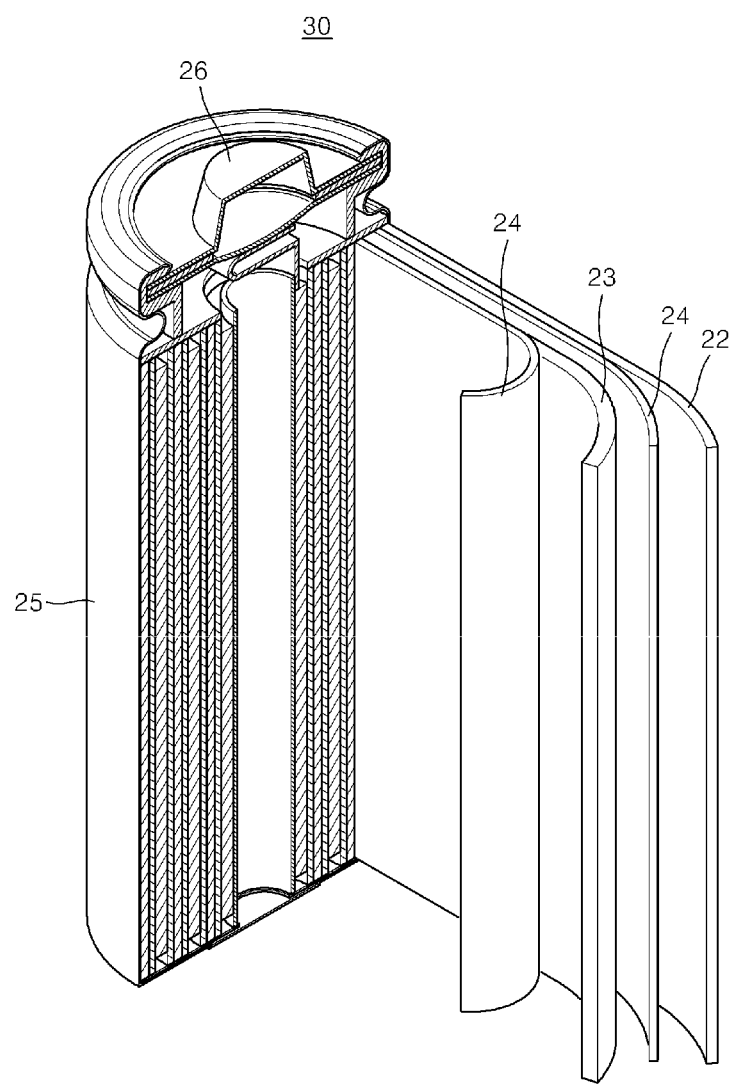
FIG. 1 is a schematic view of a lithium battery according to an embodiment of the present invention.

Reference will now be made in detail to embodiments of the invention, examples of which are illustrated in the accompanying drawings, wherein like reference numerals refer to the like elements throughout. The embodiments are described below in order to explain the invention by referring to the figures.

One or more embodiments include a cathode including a conducting agent, a binder, and a cathode active material, wherein the cathode active material includes a first lithium compound having an open-circuit voltage (OCV, with respect to lithium metal), of 3V or greater and a second lithium compound having an OCV of less than 3V, wherein the second lithium compound may have a metal oxide coating layer on a surface thereof.

Coating a surface of the second lithium compound with a metal oxide may prevent components of the second lithium compound from being discharged, and thus may suppress deterioration of the second lithium compound and dissolution or decomposition thereof, which occurs due to a reaction with an electrolytic solution.

A lower limit voltage for charging and discharging a cathode is set to 3V (with respect to lithium metal) before initial charging begins, wherein the cathode includes the first lithium compound having a relatively higher OCV and the second lithium compound having a relatively lower OCV. As a result, lithium ions are deintercalated from both the first and second lithium compounds during the initial charging. However, during subsequent discharging, lithium ions are mostly re-intercalated into the first lithium compound, whereas the lithium ions deintercalated from the second lithium compound are not re-intercalated into the second lithium compound, and rather, an anode active material is doped with the lithium ions deintercalated from the second lithium compound. During the cycles of charge and discharge subsequent to a second cycle of charge and discharge, lithium ions are mostly deintercalated from and mostly re-intercalated into the first lithium compound.

As described above, the anode active material is doped with the lithium ions deintercalated from the second lithium compound, so that the amount of transferable lithium ions is increased even with a small depth of discharge in the anode, and the anode may be operated in a reversible region. Thus, deterioration of an anode is suppressed, and the cycle characteristics of a battery are improved.

In addition, the anode active material may be uniformly doped with lithium ions. An increase in resistance, and destabilization of the lithium metal (i.e., instability in the air, firing, low softness of the electrode, etc.) accompanied by an increased interlayer space in the anode active material, which occurs as the previously doped lithium ions are re-intercalated from the anode active material, may be decreased or suppressed.

The cathode may be charged and discharged at an upper limit voltage of 4.5V or less (with respect to lithium). When the voltage is within this range, the deterioration and the reaction of the second lithium compound with an electrolytic solution may be decreased or suppressed. In addition, even when a non-aqueous electrolyte secondary battery is over-discharged to less than 3V, lithium ions may also be re-intercalated into the second lithium compound, thereby preventing further over-discharge of the battery.

The first lithium compound used in the cathode may have a layered structure, and may include a lithium metal compound containing at least one metal element selected from the group consisting of cobalt (Co), nickel (Ni) and manganese (Mn). Examples of the first lithium compound may include $LiCoO_2$, $LiNiO_2$, and $LiMnO_2$, which may be used individually or in combinations of at least two thereof.

The second lithium compound used in the cathode may include a compound represented by Formula 5 below:

$$Li_xM_yMo_zO_3 \qquad \text{Formula 5}$$

wherein $0.1 \leq x \leq 2.3$, $0 < y \leq 0.3$, and $0.7 \leq z \leq 1.1$, and wherein M is at least one element selected from the group consisting of aluminum (Al), gallium (Ga), germanium (Ge), magnesium (Mg), niobium (Nb), zinc (Zn), cadmium (Cd), titanium (Ti), cobalt (Co), nickel (Ni), potassium (K), sodium (Na), calcium (Ca), silicon (Si), iron (Fe), copper (Cu), tin (Sn), vanadium (V), boron (B), phosphorus (P), selenium (Se), bismuth (Bi), arsenic (As), zirconium (Zr), manganese (Mn), chromium (Cr), strontium (Sr), vanadium (V), scandium (Sc), yttrium (Y), and a rare-earth element, and mixtures thereof.

The second lithium compound of Formula 5 may have a layered structure, and Mo in $Li_2MoO_3$ or $Li_2MoO_3$ may be substituted with a different element. M in Formula 5 is a doping element for substituting Mo. Examples of M include Al, Ga, Ge, Mg, Nb, Zn, Cd, Ti, Co, Ni, K, Na, Ca, Si, Fe, Cu, Sn, V, B, P, Se, Bi, As, Zr, Mn, Cr, Sr, V, Sc, Y, and a rare-earth element, and a mixture thereof. For example, M may be at least one selected from the group consisting of Al, Ga, Ge, Mg, Nb, Zn, Cd, and Ti. For example, M may be at least one selected from the group consisting of Al, Mg, and Zn; or may be at least one selected from the group consisting of Al and Zn. When Mo in the second lithium compound is substituted with a different element, interlayer transfer of Mo is suppressed during charging and discharging, and thus more lithium may be intercalated/deintercalated, so that electrical characteristics, such as capacity. are improved.

As described above, the second lithium compound of Formula 5 may have a single-phase layered structure. The second lithium compound of Formula 5 may have an average particle diameter of about 0.1 µm to about 10 µm, or about 0.2 µm to about 3 µm.

The second lithium compound of Formula 5 may further include carbon, and the amount of carbon may be in a range of about 0.1 wt % to about 5 wt % based on the total weight of the second lithium compound.

In Formula 5 above, x, y, and z respectively represent relative ranges of the molar ratios of the components in the second lithium compound, wherein x may be in a range of about 0.1 to about 2.3; y may be in a range of about 0.3 or less, zero, or about 0.01 to about 0.15; and z may be in a range of about 0.7 to about 1.1, or about 0.8 to about 1.05. The second lithium compound may have improved electrical characteristics within these ranges.

Examples of the metal oxide for coating the second lithium compound in order to suppress discharging and decomposition of the second lithium compound may include at least one selected from compounds represented by Formulae 1 through 4 below:

$$M'''_a(MoO_3)_b \qquad \text{Formula 1}$$

wherein M''' may be at least one selected from the group consisting of Ba, Ca, Sr, Pb, Mn, Fe, Co, Ni, Cu, Zn, Mg, Cd, Ag, and Li, and mixtures thereof; a may be a number from about 0.5 to about 1.5; and b may be a number from about 0.3 to about 3.

$$M'_c(MoO_4)_d \quad \text{Formula 2}$$

wherein M' may be at least one selected from the group consisting of Ba, Ca, Sr, Pb, Mn, Fe, Co, Ni, Cu, Zn, Mg, Cd, Ag, and Li, and mixtures thereof; c may be a number from about 0.5 to about 1.5; and d may be a number from about 0.3 to about 3.

$$M''O_e \quad \text{Formula 3}$$

wherein M" may be at least one selected from the group consisting of Al, Mg, Si, Ti, Zr, Zn, Ba, Sr, Ca, and Li, and mixtures thereof; and e may be a number from about 0.5 to about 2.5.

$$Li_3PO_4 \quad \text{Formula 4}$$

In the compound of Formula 1, a ratio of b to a, i.e., b/a, may be from about 0.3 to about 2, or from about 0.5 to about 1.5. In the compound of Formula 2, a ratio of d to c, i.e., d/c, may be from about 0.3 to about 2, or from about 0.5 to about 1.5.

The metal oxide according to aspects of the invention is coated on the surface of the second lithium compound to form a metal oxide coating layer to protect the second lithium compound.

The metal oxide may be used in an amount of from about 0.1 to about 40 parts by weight, or from about 2 to about 10 parts by weight, based on 100 parts by weight of the second lithium compound. When the amount of the metal oxide used is within this range, discharging or decomposition of the second lithium compound may be effectively suppressed.

A method of forming the metal oxide coating layer may be any method, for example, spray coating, immersion, precipitation, a sol-gel method, hydrolysis, a hydrothermal method, or the like, which does not adversely affect the physical properties of the cathode active material.

A mixing ratio of the second lithium compound to the first lithium compound may vary according to the types of the first and second lithium compounds. For example, a mixing ratio of the second lithium compound to the first lithium compound may be, but is not limited to, in a range of from about 0.01 to about 0.3, from about 0.05 to about 0.2, or from about 0.05 to about 0.1.

One or more embodiments include a lithium battery including a cathode, an anode, and an organic electrolytic solution, wherein the cathode includes a first lithium compound and a second lithium compound having a metal oxide coating layer, as described above.

The type of the lithium battery is not limited, and may include, for example, a lithium secondary battery, such as a lithium ion battery, a lithium ion polymer battery, a lithium sulfur battery, or the like; and a lithium primary battery.

The cathode includes a current collector and a cathode active material layer disposed on the current collector. In order to form the cathode, a cathode active material as described above, a conducting agent, a binder, and a solvent may be mixed to prepare a cathode active material composition. The cathode may be manufactured by directly coating the cathode active material composition on an aluminum current collector and drying to form a cathode active material layer on the aluminum current collector. Alternatively, the cathode may be manufactured by casting the cathode active material composition on a separate support and laminating a cathode active material film, delaminated from the support, on an aluminum current collector to form a cathode active material layer on the aluminum current collector. Examples of the solvent may include, but are not limited to, N-methylpyrrolidone, acetone, water, and the like, but aspects are not limited thereto.

A cathode active material for forming the cathode active material layer includes a first lithium compound having an OCV (with respect to lithium metal), of 3V or greater and a second lithium compound having an OCV of less than 3V, wherein the second lithium compound has a metal oxide coating layer on a surface thereof.

The binder included in the cathode active material layer binds the cathode active material particles together and to the current collector. Examples of the binder may include, but are not limited to, polymers, including polyvinyl alcohol, carboxymethyl cellulose, hydroxypropyl cellulose, diacetyl cellulose, polyvinyl chloride, carboxylated poly(vinyl chloride), polyvinyl fluoride, and ethylene oxide, polyvinylpyrrolidone, polyurethane, polytetrafluoroethylene, polyvinylidene fluoride, polyethylene, polypropylene, styrene-butadiene rubber (SBR), acrylated SBR, epoxy resin, and nylon.

The conducting agent included in the cathode active material layer provides electrical conductivity to the electrode. Any electronic conductive material causing no chemical change in the resultant batteries may be used. Examples of the conducting agent include, but are not limited to, carbonaceous materials, such as natural graphite, artificial graphite, carbon black, acetylene black, ketchen black, nanocarbon, and carbon fibers; metal-based materials, such as copper, nickel, aluminum, and silver, in powder or fiber form; and conducting materials, including conducting polymers, such as a polyphenylene derivatives, and mixtures thereof.

Aluminum (Al) may be used as the current collector, but the material for the current collector is not limited thereto.

Similarly to the manufacturing of the cathode described above, an anode active material, a conducting agent, a binder, and a solvent may be mixed to prepare an anode active material composition. The anode active material composition may be directly coated on a copper current collector to prepare an anode. Alternatively, the anode material composition may be cast on a separate support, and then an anode active material film, delaminated from the support, may be laminated on the copper current collector to prepare an anode. The amounts of the anode active material, the conducting agent, the binder, and the solvent are the same as those commonly used in a lithium battery.

Examples of the anode active material may include materials capable of intercalating and deintercalating lithium ions, such as lithium metal, a lithium alloy, cokes, artificial graphite, natural graphite, a calcinated organic polymer compound, nanocarbon, and carbon fiber. The same conducting agent, binder, and solvent used for the cathode may be used for the anode.

If required, a plasticizer may be added to the cathode active material composition and the anode active material composition to form pores inside the cathode and anode.

A separator may be disposed between the cathode and the anode according to the type of the lithium battery. The separator may be any suitable separator for lithium batteries. For example, the separator may have a low resistance to the migration of ions in an electrolyte and have a high electrolyte-retaining ability. Examples of the separator may include glass fiber, polyester, TEFLON®, polyethylene, polypropylene, polytetrafluoroethylene (PTFE), and combinationS thereof, each of which may be in a nonwoven fabric or a woven fabric. In particular, a windable separator including polyethylene, polypropylene, or the like may be used for a lithium ion battery. A separator capable of retaining a large amount of an organic electrolytic solution may be used for a lithium-ion polymer battery. The separator may be manufactured as described below.

A polymer resin, a filler, and a solvent are mixed to prepare a separator composition. The separator composition may be directly coated on an electrode and then dried to form a separator film. Alternatively, the separator composition may be cast on a support and then dried to form a separator composition film. The separator composition film may be delaminated from the support and then laminated on an electrode to form a separator film.

The polymer resin is not particularly limited and may be any suitable material as a binder for electrode plates. Examples of the polymer resin may include, but are not limited to, a vinylidene fluoride/hexafluoropropylene copolymer, polyvinylidene fluoride, polyacrylonitrile, polymethylmethacrylate, and mixtures thereof. For example, a vinylidene fluoride/hexafluoropropylene copolymer including 8 to 25 wt % of hexafluoropropylene may be used.

The separator may be disposed between the cathode and the anode to form an electrode assembly. The electrode assembly is wound or folded and then sealed in a cylindrical or rectangular battery case. Then, an organic electrolyte solution is injected into the battery case to complete the manufacture of a lithium ion battery. Alternatively, a plurality of electrode assemblies may be stacked in a bi-cell structure and impregnated with an organic electrolyte solution. The resultant may be disposed in a pouch and hermetically sealed, thereby completing a lithium ion polymer battery. Meanwhile, a plurality of electrode assemblies can be stacked in a bi-cell structure, and then dipped in an organic electrolytic solution. The obtained structure may be placed in a pouch and sealed to manufacture a lithium ion polymer battery.

An organic electrolyte for the lithium battery may include lithium salt, and an organic solvent mixture of a solvent having a high dielectric constant and a solvent having a low boiling point. The solvent having a high dielectric constant may be any solvent that is used in the art. For example, the solvent may be a cyclic carbonate, such as ethylene carbonate, propylene carbonate, or butylene carbonate; or gamma-butyrolactone.

The solvent having a low boiling point may be any solvent that is used in the art. For example, the solvent having a low boiling point may be a chain carbonate, such as dimethyl carbonate, ethyl methyl carbonate, diethyl carbonate, or dipropyl carbonate; or ester derivatives of fatty acids.

The mixture ratio of the solvent having a high dielectric constant to the solvent having a low boiling point may be in a range of 1:1 to 1:9. When the mixture ratio is outside this range, discharge capacity and charge and discharge lifetimes may be decreased.

The lithium salt may be any lithium salt that is used in conventional lithium batteries. For example, the lithium salt may include one or more compounds selected from the group consisting of $LiClO_4$, $LiCF_3SO_3$, $LiPF_6$, $LiN(CF_3SO_2)$, $LiBF_4$, $LiC(CF_3SO_2)_3$, and $LiN(C_2F_5SO_2)_2$, and mixtures thereof.

In the organic electrolyte, the concentration of the lithium salt may be in a range of from about 0.5 to about 2M. When the concentration of the lithium salt is less than about 0.5M, the conductivity of the organic electrolyte may be decreased. On the other hand, when the concentration of the lithium salt is greater than about 2.0M, the viscosity of the organic electrolyte may be increased and the mobility of lithium ions may be degraded.

FIG. 1 is a schematic view of a typical structure of a lithium battery 30 according to an embodiment of the present invention. Referring to FIG. 1, the lithium battery 30 includes a cathode 23; an anode 22; a separator 24 disposed between the cathode 23 and the anode 22; and an electrolyte (not shown) impregnated into the cathode 23, the anode 22, and the separator 24; a case 25, and a sealing member 26, which seals the case 25. The lithium battery 30 is manufactured by sequentially stacking the cathode 23, the anode 22, and the separator 24, winding the stack into a spiral or jelly-roll form, and disposing the wound stack in the case 25.

Hereinafter, one or more embodiments will be described in detail with reference to the following examples. However, these examples are not intended to limit the purpose and scope of the present invention.

COMPARATIVE EXAMPLE 1

Initially, $Li_2MoO_4$ was prepared through a solid-phase reaction. To this end, $Li_2CO_3$ and $MoO_3$, both in powder form, were mixed in a ratio of 1.05:1 by weight and reacted at 500° C. for 5 hours. A white, homogeneous $Li_2MoO_4$ composition was prepared, and carbon was added in the same number of moles as $Li_2MoO_4$ and then uniformly mixed for a reaction represented by Reaction 1 below to produce $Li_2MoO_3$. The reaction was processed at 700° C. in a reduction atmosphere for 10 hours.

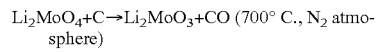

$Li_2MoO_4 + C \rightarrow Li_2MoO_3 + CO$ (700° C., $N_2$ atmosphere)      Reaction 1

A half cell (2032 size) was assembled from an electrode manufactured by coating an Al foil with a slurry containing the $Li_2MoO_3$ active material prepared above, a carbon conducting agent, and a PVDF binder in a weight ratio of 93:2:5, and a lithium counter electrode. Then, the half cell was electrochemically evaluated while being charged at 60° C. and a constant current of 0.05 C until the voltage thereof reached 4.5 V (with respect to Li). 1.3M $LiPF_6$ in a mixed solution of ethylene carbonate (EC) and diethyl carbonate (DEC) in a volume ratio of 3:7 were used as an electrolytic solution for the electrochemical evaluation.

COMPARATIVE EXAMPLE 2

A lithium battery was manufactured using an active material in powder form prepared by mixing the $Li_2MoO_3$ prepared in Comparative Example 1 and $LiCoO_2$ in a weight ratio of 2:8. A half cell (2032 size) was assembled from an electrode manufactured by coating an Al foil with a slurry containing the mixed active material, a carbon conducting agent, and a PVDF binder in a weight ratio of 96:2:2, and a lithium counter electrode. Then, the half cell was electrochemically evaluated while being charged at 45° C. and a constant current of 1 C in a voltage range of about 3 to about 4.4V (with respect to Li).

EXAMPLE 1

In order to prepare active material powder coated with 5 wt % $CaMoO_3$, $CaNO_3 \cdot 4H_2O$ and $Li_2MoO_4$ were measured in a mole ratio of 5:95 and then uniformly mixed with ethanol before carbothermal reduction, similar to as described with respect to Comparative Example 1. After the ethanol was evaporated, carbon was added in the same number of moles as $Li_2MoO_4$, mixed, and thermally treated at 700° C. in a nitrogen atmosphere for 10 hours to complete the preparation of the surface-coated active material.

Electrochemical evaluation was conducted in the same manner as in Comparative Example 1. The fully charged battery was disassembled to perform X-ray photoelectron spectroscopy (XPS) on a surface of the lithium counter electrode.

EXAMPLE 2

Active material powder coated with 5 wt % $BaMoO_3$ was prepared in the same manner as in Example 1, except that $BaNO_3$, instead of $CaNO_3.4H_2O$, was used in the same amount as $CaNO_3.4H_2O$ used in Example 1. Electrochemical evaluation was conducted in the same manner as in Comparative Example 1.

EXAMPLE 3

In order to prepare active material powder coated with 3 wt % $CaMoO_4$, $CaNO_3.4H_2O$ and $Li_2MoO_3$, which was prepared in Comparative Example 1, were measured in a weight ratio of 3.5:100, and then uniformly mixed with ethanol. After the ethanol was evaporated, the dried powder was further thermally treated at 700° C. for 1 hour while a nitrogen gas including 5% hydrogen was supplied. Electrochemical evaluation was conducted in the same manner as in Comparative Example 2.

EXAMPLE 4

In order to prepare active material powder coated with 3 wt % $BaMoO_4$, $BaNO_3$ and $Li_2MoO_3$, which was prepared in Comparative Example 1, were measured in a weight ratio of 2.6:100 and uniformly mixed with water. After the water was evaporated, the dried powder was further thermally treated at 700° C. for 1 hour while a nitrogen gas including 5% hydrogen was supplied. Electrochemical evaluation was conducted in the same manner as in Comparative Example 2.

EXAMPLE 5

In order to prepare active material powder coated with 3 wt % $Li_3PO_4$, $LiOH.H_2O$, $NH_4H_2PO_4$, and $Li_2MoO_3$, which was prepared in Comparative Example 1, were measured in a weight ratio of 0.06:0.03:100 and then uniformly mixed with water. After the water was evaporated, the dried powder was further thermally treated at 500° C. for 30 minutes while a nitrogen gas including 5% hydrogen was supplied. Electrochemical evaluation was conducted in the same manner as in Comparative Example 2.

EXAMPLE 6

In order to prepare active material powder coated with 2 wt % $SiO_2$, $SiC_9H_{23}NO_3$ and $Li_2MoO_3$, which was prepared in Comparative Example 1, were measured in a weight ratio of 7.4:100, and then uniformly mixed together and dried. The dried powder was further thermally treated at 600° C. for 1 hour while a nitrogen gas including 5% hydrogen was supplied. Electrochemical evaluation was conducted in the same manner as in Comparative Example 2.

EXAMPLE 7

In order to prepare active material powder coated with 2 wt % $TiO_2$, $Ti[OCH(CH_3)_2]_4$ and $Li_2MoO_3$, which was prepared in Comparative Example 1, were measured in a weight ratio of 7.1:100, and then uniformly mixed together and dried. The dried powder was further thermally treated at 600° C. for 1 hour while a nitrogen gas including 5% hydrogen was supplied. Electrochemical evaluation was conducted in the same manner as in Comparative Example 2.

EXAMPLE 8

In order to prepare active material powder coated with 2 wt % $ZrO_2$, $ZrC_{15}H_{36}O_5$ and $Li_2MoO_3$, which was prepared in Comparative Example 1, were measured in a weight ratio of 6.3:100, and then uniformly mixed together and dried. The dried powder was further thermally treated at 600° C. for 1 hour while a nitrogen gas including 5% hydrogen was supplied. Electrochemical evaluation was conducted in the same manner as in Comparative Example 2.

EXAMPLE 9

In order to prepare active material powder coated with 5 wt % ZnO, $Zn(NO_3)_{2.6}H_2O$ and $Li_2MoO_3$, which was prepared in Comparative Example 1, were measured in a weight ratio of 18.3:100, and then uniformly mixed together and dried. The dried powder was further thermally treated at 700° C. for 1 hour while a nitrogen gas including 5% hydrogen was supplied. Electrochemical evaluation was conducted in the same manner as in Comparative Example 2.

Figure 2:
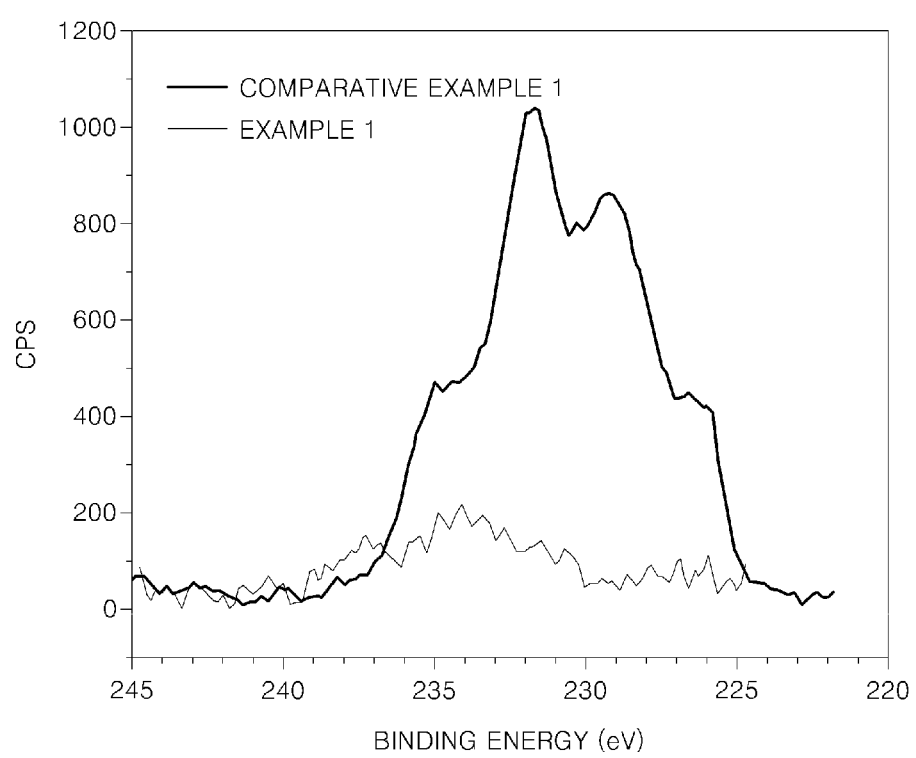
FIG. 2 shows the XPS spectra of Mo 3d on lithium counter electrodes of batteries according to Example 1 and Comparative Example 1.

FIG. 2 shows the XPS spectra of Mo 3d on the lithium counter electrodes of the batteries according to Example 1 and Comparative Example 1, which were disassembled after being charged at 60° C. to a voltage of 4.5V. In the battery of Comparative Example 1, a distinct Mo peak appeared, and the amount of Mo, obtained as a result of the surface composition analysis, was about 2.86 wt %. However, in the battery of Example 1, a Mo peak was very indistinct, and the amount of Mo was about 0.39 wt %. This indicates that the surface coating layer of the active material effectively suppresses the discharge of Mo at a high temperature and a high voltage.

Figure 3:
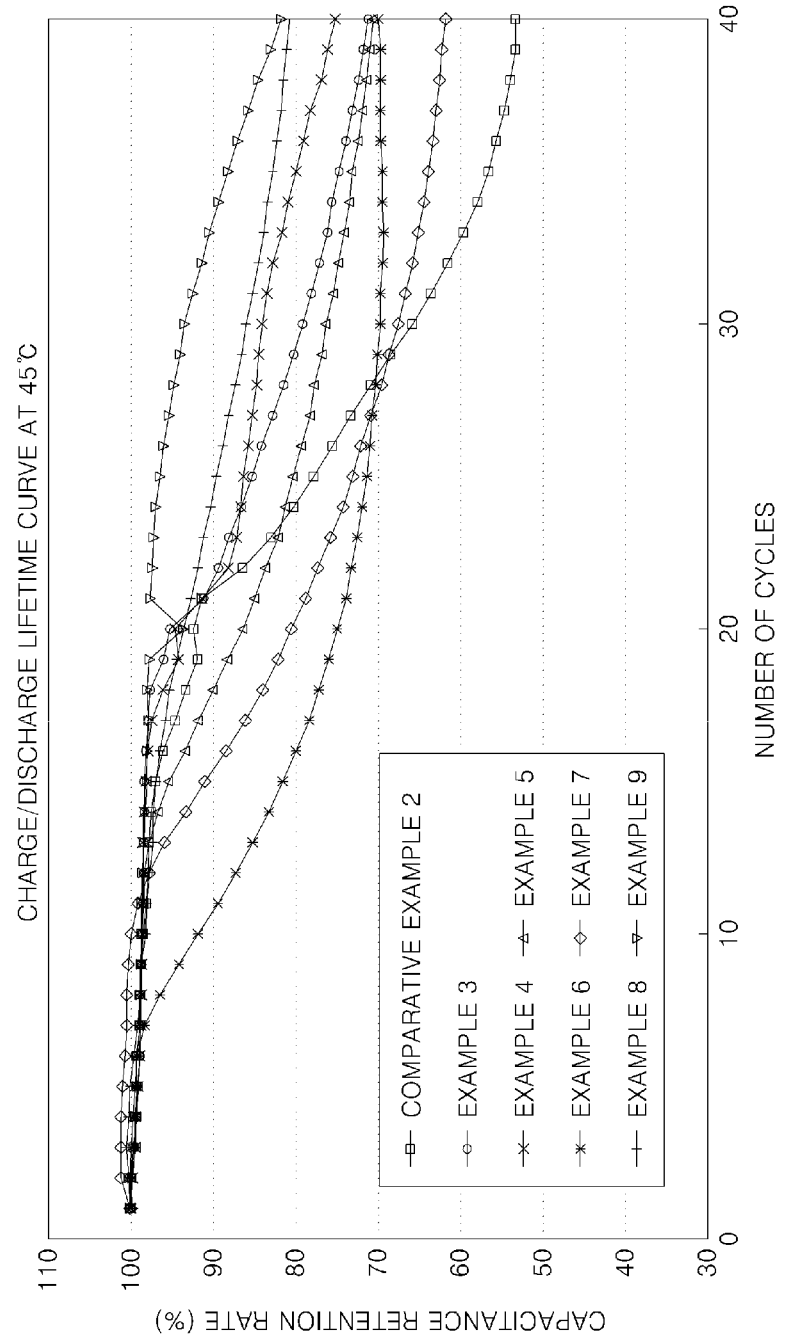
FIG. 3 is a graph of capacitance retention rate with respect to the number of cycles of lithium batteries including cathode active materials prepared in Comparative Example 2 and Examples 3 through 9.

FIGS. 3 and 4 are graphs showing high-temperature charging/discharging behaviors of the batteries according to Comparative Example 2 and Examples 3 through 9. In the battery of Comparative Example 2 prepared using the non surface-treated active material powder, the charge/discharge lifetime was markedly reduced, and coulombic efficiency was the lowest. However, the batteries of Examples 3 through 9 including different surface-coated active materials had a higher coulombic efficiency of about 99% and a significantly longer lifetime than general batteries. In particular, the batteries of Examples 8 and 9 had a capacitance retention rate of about 80% at 40 charge/discharge cycles.

As described above, a cathode according to the present invention includes two different lithium compounds having different OCVs, wherein a surface of at least one of the lithium compounds is coated with a metal oxide in order to suppress discharge of a metallic compound from the lithium compound. Thus, the cathode has improved electrical characteristics, and thus may be useful for various lithium batteries, for example, lithium secondary batteries.

Although a few embodiments of the invention have been shown and described, it would be appreciated by those skilled in the art that changes may be made in this embodiment without departing from the principles and spirit of the invention, the scope of which is defined in the claims and their equivalents.

What is claimed is:
1. A cathode comprising:
 a current collector; and
 a cathode active material composition disposed on a surface of the current collector, the cathode active material composition comprising a conducting agent, a binder, and a cathode active material, wherein the cathode active material comprises a first lithium compound selected from the group consisting of LiCoO$_2$, LiNiO$_2$, LiMnO$_2$, and combinations thereof, and a second lithium compound comprising a compound represented by Formula 5 below:

$$Li_xM_yMo_zO_3 \quad \text{Formula 5}$$

wherein $0.1 \leq x \leq 2.3$, $0 \leq y \leq 0.3$, and $0.7 \leq z \leq 1.1$, and M is at least one element selected from the group consisting of aluminum (Al), gallium (Ga), germanium (Ge), magnesium (Mg), niobium (Nb), zinc (Zn), cadmium (Cd), titanium (Ti), cobalt (Co), nickel (Ni), potassium (K), sodium (Na), calcium (Ca), silicon (Si), iron (Fe), copper (Cu), tin (Sn), vanadium (V), boron (B), phosphorus (P), selenium (Se), bismuth (Bi), arsenic (As), zirconium (Zr), manganese (Mn), chromium (Cr), strontium (Sr), vanadium (V), scandium (Sc), yttrium (Y), and a rare-earth element, and mixtures thereof, wherein the second lithium compound comprises a metal oxide coating layer, and the metal oxide coating layer comprises at least one metal oxide selected from compounds represented by Formulae 1 through 4 below:

$$M'''_a(MoO_3)_b \quad \text{Formula 1}$$

wherein M''' is at least one selected from the group consisting of barium (Ba), calcium (Ca), strontium (Sr), lead (Pb), manganese (Mn), iron (Fe), cobalt (Co), nickel (Ni), copper (Cu), zinc (Zn), magnesium (Mg), cadmium (Cd), silver (Ag), and lithium (Li);

a is a number from about 0.5 to about 1.5; and b is a number from about 0.3 to about 3.0, $$M'_c(MoO_4)_d \quad \text{Formula 2}$$

wherein M' is at least one selected from the group consisting of barium (Ba), calcium (Ca), strontium (Sr), lead (Pb), manganese (Mn), iron (Fe), cobalt (Co), nickel (Ni), copper (Cu), zinc (Zn), magnesium (Mg), cadmium (Cd), silver (Ag), and lithium (Li);

c is a number from about 0.5 to about 1.5; and d is a number from about 0.3 to about 3.0, $$M''O_e \quad \text{Formula 3}$$

wherein M'' is at least one selected from the group consisting of aluminum (Al), magnesium (Mg), silicon (Si), titanium (Ti), zirconium (Zr), zinc (Zn), barium (Ba), strontium (Sr), calcium (Ca), and lithium (Li); and e is a number from about 0.5 to about 2.5, $$Li_3PO_4 \quad \text{Formula 4.}$$

2. The cathode of claim 1, wherein the metal oxide coating layer comprises the metal oxide represented by Formula 1.

3. The cathode of claim 1, wherein the metal oxide coating layer comprises the metal oxide represented by Formula 2.

4. The cathode of claim 1, wherein the metal oxide coating layer comprises the metal oxide represented by Formula 3.

5. The cathode of claim 1, wherein the metal oxide coating layer comprises the metal oxide represented by Formula 4.

6. The cathode of claim 1, wherein M is at least one selected from the group consisting of aluminum (Al), magnesium (Mg), and zinc (Zn).

7. The cathode of claim 1, wherein the compound of Formula 5 has a layered structure.

8. The cathode of claim 1, wherein the second lithium compound further comprises carbon, and the amount of carbon is in a range of about 0.1 wt% to about 5 wt% based on the total weight of the second lithium compound.

9. The cathode of claim 1, wherein a mixing weight ratio of the second lithium compound to the first lithium compound is in a range of about 0.01 to about 0.3.

10. The cathode of claim 1, wherein the metal oxide coating layer is at least one metal oxide selected from the group consisting of CaMoO$_3$, BaMoO$_3$, CaMoO$_4$, BaMoO$_4$, SiO$_2$, TiO$_2$, ZrO$_2$, ZnO, and mixtures thereof.

11. A lithium battery comprising:
the cathode according to claim 1;
an anode;
a separator disposed between the anode and the cathode; and
an organic electrolytic solution disposed in the lithium battery.

12. A cathode active material for a lithium battery, the cathode active material comprising:
a first lithium compound selected from the group consisting of LiCoO$_2$, LiNiO$_2$, LiMnO$_2$, and combinations thereof, and a second lithium compound comprising a compound represented by Formula 5 below, and the second lithium compound comprising a metal oxide coating, $$Li_xM_yMo_zO_3 \quad \text{Formula 5}$$

wherein $0.1 \leq x \leq 2.3$, $0 \leq y \leq 0.3$, and $0.7 \leq z \leq 1.1$, and M is at least one element selected from the group consisting of aluminum (Al), gallium (Ga), germanium (Ge), magnesium (Mg), niobium (Nb), zinc (Zn), cadmium (Cd), titanium (Ti), cobalt (Co), nickel (Ni), potassium (K), sodium (Na), calcium (Ca), silicon (Si), iron (Fe), copper (Cu), tin (Sn), vanadium (V), boron (B), phosphorus (P), selenium (Se), bismuth (Bi), arsenic (As), zirconium (Zr), manganese (Mn), chromium (Cr), strontium (Sr), vanadium (V), scandium (Sc), yttrium (Y), and a rare-earth element, and mixtures thereof, wherein the metal oxide coating comprises at least one metal oxide selected from compounds represented by Formulae 1 through 4 below:

$$M'''_a(MoO_3)_b \quad \text{Formula 1}$$

wherein M''' is at least one selected from the group consisting of barium (Ba), calcium (Ca), strontium (Sr), lead (Pb), manganese (Mn), iron (Fe), cobalt (Co), nickel (Ni), copper (Cu), zinc (Zn), magnesium (Mg), cadmium (Cd), silver (Ag), and lithium (Li);

a is a number from about 0.5 to about 1.5; and b is a number from about 0.3 to about 3.0, $$M'_c(MoO_4)_d \quad \text{Formula 2}$$

wherein M' is at least one selected from the group consisting of barium (Ba), calcium (Ca), strontium (Sr), lead (Pb), manganese (Mn), iron (Fe), cobalt (Co), nickel (Ni), copper (Cu), zinc (Zn), magnesium (Mg), cadmium (Cd), silver (Ag), and lithium (Li);

c is a number from about 0.5 to about 1.5; and d is a number from about 0.3 to about 3.0, $$M''O_e \quad \text{Formula 3}$$

wherein M'' is at least one selected from the group consisting of aluminum (Al), magnesium (Mg), silicon (Si), titanium (Ti), zirconium (Zr), zinc (Zn), barium (Ba), strontium (Sr), calcium (Ca), and lithium (Li); and e is a number from about 0.5 to about 2.5, $$Li_3PO_4 \quad \text{Formula 4.}$$

* * * * *